W. PETERSON.
WATER MOTOR.
APPLICATION FILED MAR. 21, 1922.

1,426,838.

Patented Aug. 22, 1922.
3 SHEETS—SHEET 3.

Inventor
W. Peterson

UNITED STATES PATENT OFFICE.

WILLIAM PETERSON, OF SARGENT, NEBRASKA.

WATER MOTOR.

1,426,838. Specification of Letters Patent. Patented Aug. 22, 1922.

Application filed March 21, 1922. Serial No. 545,518.

*To all whom it may concern:*

Be it known that I, WILLIAM PETERSON, a citizen of the United States, residing at Sargent, in the county of Custer and State of Nebraska, have invented a new and useful Water Motor, of which the following is a specification.

This invention relates to water motors designed primarily for use in swift currents such as found in many sections, so that the power thus obtained can be utilized for various purposes, such as generation of electricity.

Another object of the invention is to provide a water motor having means whereby the operation thereof can be maintained subtantially uniform irrespective of variations in the speed of the water current, thereby allowing an electric generator to be driven by the motor at a uniform speed.

Another object is to provide a structure of this character which is simple and compact in construction, can be installed readily, and will not readily get out of order.

With the foregoing and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings the preferred form of the invention has been shown.

In said drawings—

Figure 1:
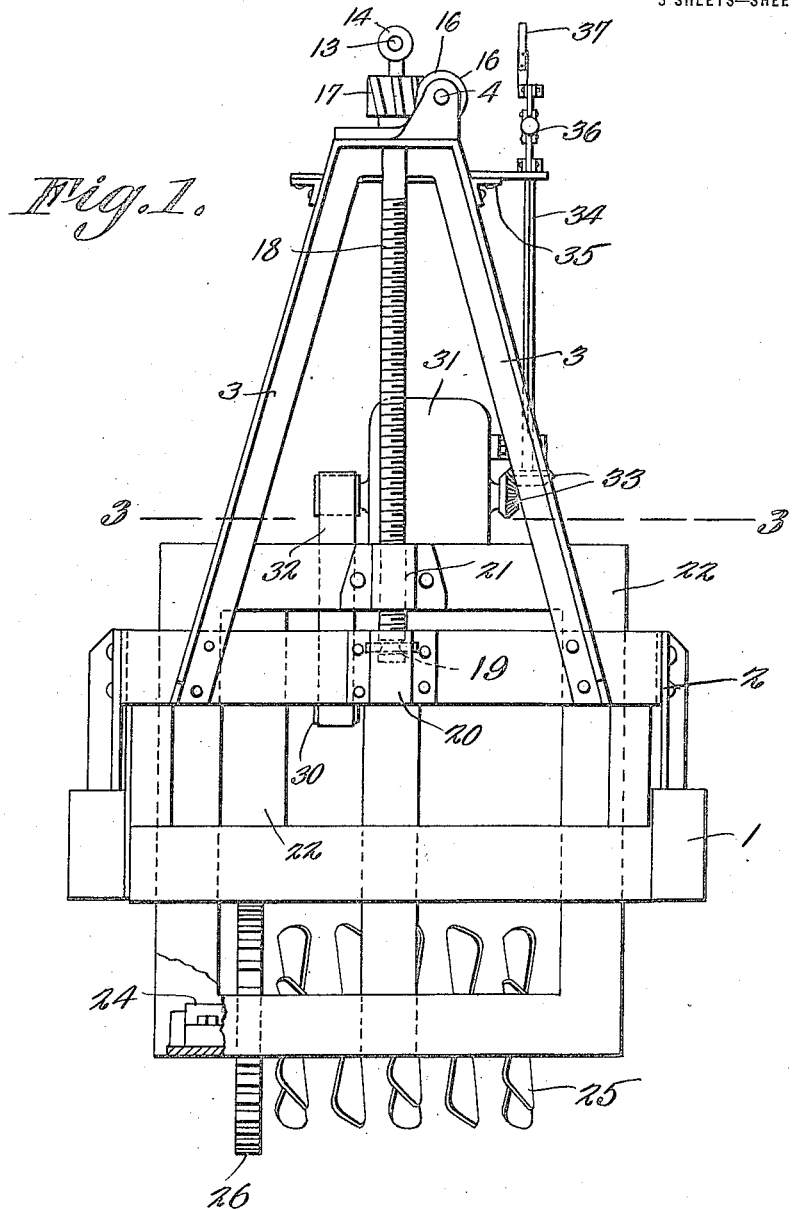
Figure 1 is a side elevation of the apparatus, a portion being shown in section.

Referring to the figures by characters of reference 1 designates a supporting structure of any desired construction which can be extended over the current of water, this structure being mounted on the bank of the stream or being held in position in any other manner desired so that it will be fixed relative to the bank. Secured within the structure 1 is an upstanding guide frame 2 having oppositely disposed standards 3 on the upper ends of which is journaled a transverse adjusting shaft 4. A driving element, such as an electric motor 5 is supported between and moves with the standards 3 and has a gear 6 meshing with a double gear 7 supported between the standards 3 and projecting between and constantly meshing with opposed gears 8 and 9 loosely mounted on the shaft 4. These gears 8 and 9 have clutch faces 10 either of which is adapted to be engaged by one end of a clutch member 11 feathered on the shaft 4 and interposed between the gears 8 and 9. The clutch member 11 is rotatably mounted within an arm 12 extending from the center of a solenoid armature 13 in the form of a bar the ends of which project into aligning spaced magnets 14 and 15 respectively. Thus it will be seen that when one of the magnets is energized the bar 13 will pull the clutch member 11 in one direction to couple one of the gears 8 or 9 to the shaft 4 whereas when the other magnet is energized the other gear 9 or 8 will be coupled to the shaft 4. Thus the operation of the motor 5 will result in the shaft 4 being rotated in either of two directions provided one or the other of the gears 9 is coupled to the shaft.

Mounted on the end portions of the shaft 4 so as to rotate therewith are worms 16 meshing with gears 17 secured to the upper end portions of shifting screws 18 journaled within the upper ends of the standards 3 and extending downwardly. The lower ends of the screws are swiveled, as at 19, within bearings 20 secured to the sides of the frame 2 and the intermediate portions of the screws engage blocks 21 secured to the sides of a shiftable frame 22 slidable within the structure 2.

Journaled within the bottom portion of the shiftable frame 22 are parallel shafts 23 journaled in bearings 24 and on each of these shafts is secured a series of propellers 25 each consisting of an annular set of radial blades inclined as shown, the blades of the propellers on one shaft 23 being fixed oppositely to the blades of the propellers on the other shaft. Furthermore all of the blades on each shaft are disposed in staggered relation.

Secured to the two shafts 23 are gears 26 which mesh with each other so that the two shafts 23 are compelled to rotate at the same speed but in opposite directions respectively. Meshing with one of these gears 26 is another gear 27 adapted to transmit motion to small gears 28 secured to shaft 29 journaled in the upper portion of the slidable frame 22. To each of these shafts can be secured a pulley 30 whereby power can be transmitted through belts. If desired an electric generator 31 can be mounted on the slidable frame 22 and can be coupled to one of the pulleys 30 by a belt 32. Where this arrangement is employed the motor 5 is electrically connected to the generator.

Figure 4:
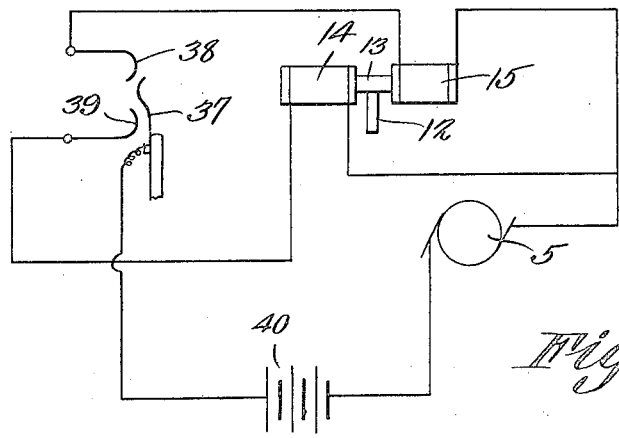
Figure 4 is a diagram showing the electric controlling mechanism.

As a means for controlling the speed of rotation of the shaft 23 gears 33 are provided for transmitting motion from the shaft of the generator 31 to an upwardly extending shaft 34 slidable within the supporting structure 35 on which the motor 5 is mounted. This shaft is also slidable within but operatively connected to a centrifugal governor 36 and the slidable portion of the governor carries a movable contact 37 adapted to engage either of two spaced contacts 38 and 39. As shown in Figure 4 these contacts are electrically connected to the respective solenoids 15 and 14 and also to the motor 5 and a storage battery 40.

Figure 2:
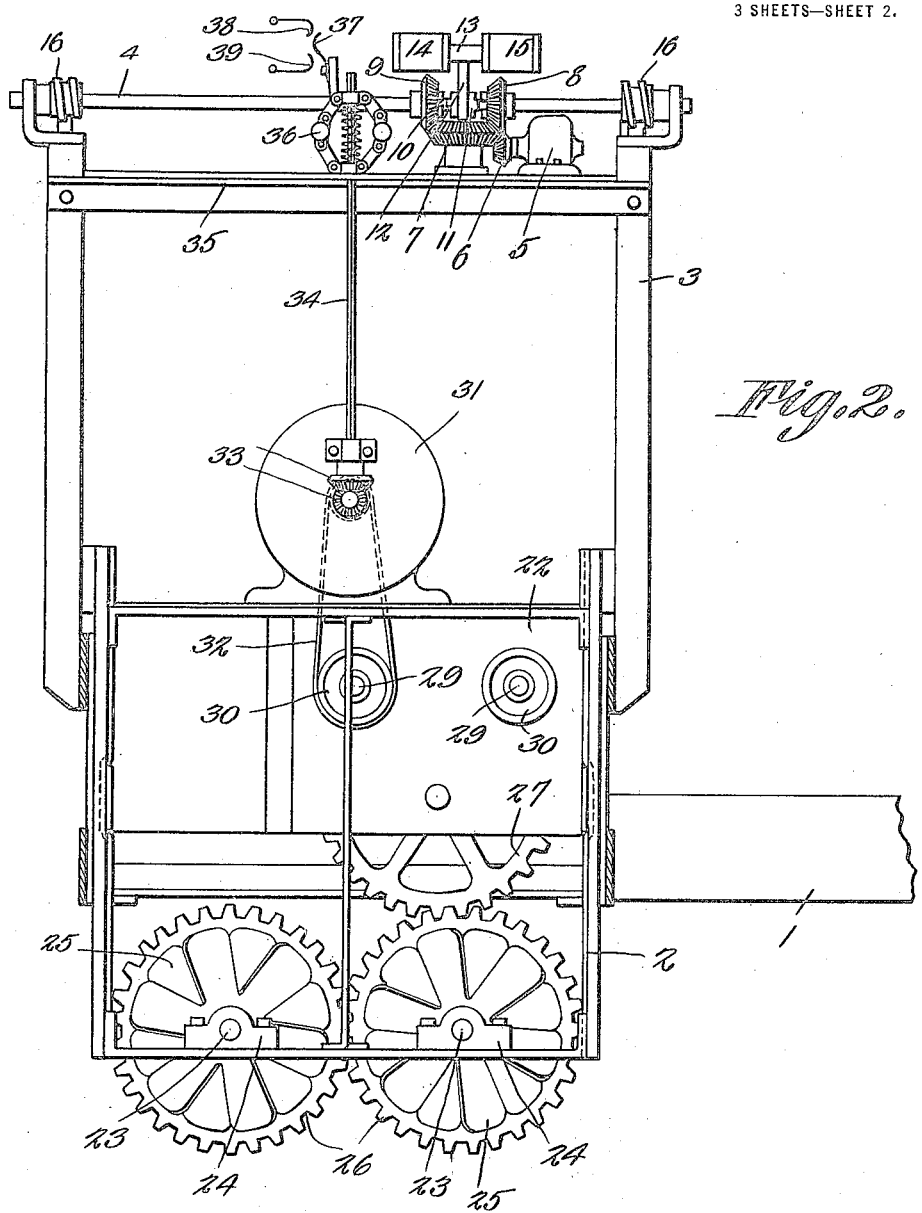
Figure 2 is a front elevation, the guide frame being shown in section.
Figure 3:
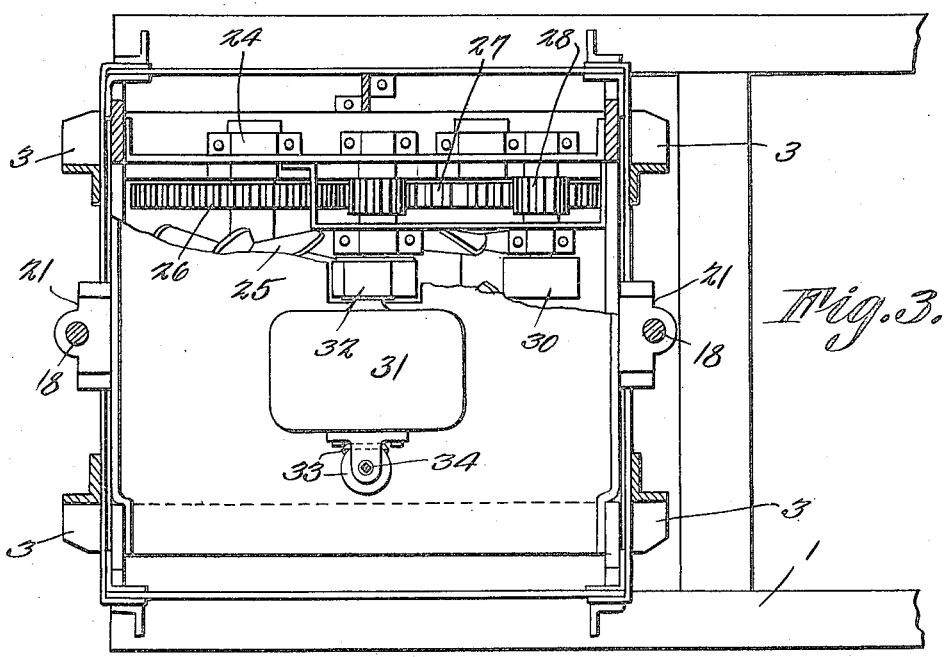
Figure 3 is a section taken on the line 3—3, Figure 1.

It will be noted that all parts of the structure 2 and the movable frame 22 are placed with their edges upstream and with their flat side faces substantially parallel with the current. The shafts 23 and the propelling blades thereon are normally submerged and the water current will cause the blades to rotate the shafts in opposite directions at a high speed so that motion will be transmitted to the generator. The centrifugal governor will thus be operated and should the speed of rotation of the shafts 23 become excessive the governor will operate to close the circuit to one of the solenoids and to the motor 5 so that the motor will be operated and motion will be transmitted to the shaft 4 so as to drive the screws 18 and raise the movable frame 22 to lift the propeller blade partly out of the water. Thus the speed of rotation will be reduced and the governor will break the contact between 37 and the contact engaged thereby so that said contact 37 will be maintained in a neutral position as shown in Figures 2 and 4 until the speed of rotation of the shafts 23 becomes undesirably low whereupon the governor will shift contact 37 so as to close the circuit to the other solenoid with the result that the shafts 23 will be lowered into the water and a greater speed of rotation result therefrom.

What is claimed is:—

1. Apparatus of the class described including a stationary structure, a frame mounted for up and down sliding movement therein, parallel shafts journaled within the lower portion of the frame, a series of propellers upon the shafts for rotating the shafts in opposite directions respectively, meshing gears on the shafts, a generator movable with the frame, means for transmitting motion to the generator from the gears, motor driven screws for raising and lowering the frame, a centrifugal governor driven by the gears, and electrically operated means controlled by the governor for controlling the operation of the motor and for raising or lowering the frame to maintain a substantially uniform speed of rotation of the propellers.

2. In apparatus of the class described a stationary structure, a vertically movable frame therein, oppositely rotating parallel series of propellers carried by the frame, a generator movable with the frame, means for transmitting motion to the generator from the propellers, a governor driven by the propellers, mechanism for raising and lowering the frame to move the propellers into and out of a water current, an electric motor, electrically controlled reversing gears, and means controlled by the governor for regulating the operation of the motor and the gears to automatically raise or lower the frame and maintain a substantially uniform speed of rotation of the propellers.

In testimony that I claim the foregoing as my own, I have hereto affixed my signature in the presence of two witnesses.

WILLIAM PETERSON.

Witnesses:
Ivy E. Simpson,
Agnes Rockelli.